United States Patent
Tsubota

(10) Patent No.: US 7,986,663 B2
(45) Date of Patent: Jul. 26, 2011

(54) APPARATUS FOR SETTING COMMUNICATION CHANNELS ADAPTIVELY TO A RADIO WAVE ENVIRONMENT TO IMPROVE THE DEGREE OF FREEDOM OF DEPLOYMENT AND A METHOD THEREFOR

(75) Inventor: Azuma Tsubota, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 884 days.

(21) Appl. No.: 11/708,541

(22) Filed: Feb. 21, 2007

(65) Prior Publication Data
US 2007/0197245 A1 Aug. 23, 2007

(30) Foreign Application Priority Data
Feb. 22, 2006 (JP) .................. 2006-045473

(51) Int. Cl.
*H04W 4/00* (2009.01)
*H04L 12/26* (2006.01)
*H04L 12/28* (2006.01)
*H04L 12/43* (2006.01)

(52) U.S. Cl. ........ 370/329; 370/338; 370/252; 370/254; 370/255; 370/461

(58) Field of Classification Search .................... 455/75, 455/87
See application file for complete search history.

(56) References Cited

U.S. PATENT DOCUMENTS

| | | | |
|---|---|---|---|
| 7,058,113 B2 | 6/2006 | Etoh | |
| 7,738,374 B2 | 6/2010 | Yagyu et al. | |
| 7,796,571 B2 | 9/2010 | Kishida | |
| 2002/0004369 A1* | 1/2002 | Kelly et al. | 455/12.1 |
| 2002/0097696 A1* | 7/2002 | Kossi et al. | 370/330 |
| 2004/0090943 A1* | 5/2004 | da Costa et al. | 370/338 |
| 2004/0180656 A1* | 9/2004 | Stephan et al. | 455/434 |
| 2004/0221058 A1* | 11/2004 | de Boer et al. | 709/238 |
| 2004/0243716 A1* | 12/2004 | Ryll | 709/232 |

FOREIGN PATENT DOCUMENTS

| | | |
|---|---|---|
| CN | 1450727 A | 10/2003 |
| JP | 2005-020566 | 1/2005 |
| JP | 2006-050549 A | 2/2006 |

* cited by examiner

*Primary Examiner* — Pierre-Louis Desir
*Assistant Examiner* — Joshua Schwartz
(74) *Attorney, Agent, or Firm* — Rabin & Berdo, P.C.

(57) ABSTRACT

A wireless LAN includes two interfaces with a transmitter-receiver function and a channel controller. One of the two interfaces employs one communication channel to search for a communication channel being used by a destination communication unit. The channel controller determines a surrounding radio wave condition based on the communication channel obtained by the searching, and controls channel setting so that the respective communication channels of the two interfaces differ from each.

20 Claims, 10 Drawing Sheets

APPARATUS FOR SETTING COMMUNICATION CHANNELS ADAPTIVELY TO A RADIO WAVE ENVIRONMENT TO IMPROVE THE DEGREE OF FREEDOM OF DEPLOYMENT AND A METHOD THEREFOR

BACKGROUND OF THE INVENTION

1. Field of the Invention

The present invention relates to a channel setting apparatus and a method therefor, and more particularly to a channel setting apparatus for use in a wireless communication network, and a method therefor.

2. Description of the Background Art

In a wireless network system, access between wireless network terminals lying in a communication service range is controlled, for instance, by a wireless access unit such as an access point. In general, access points are provided on a wired network, and connected to an external network and other access points through the wired network. Because of this, access points could not be installed where wired connections cannot be laid, so that there was a problem that a wireless network system capable of connecting to an external network cannot be constructed on such premises.

In order to overcome such a problem, a wireless network system is constructed such that a plurality of access points are deployed in a mesh form communicable with one another by radio. This minimizes the wired connections in the wireless network system with an area connectable to the wireless network expanded. A wireless mesh network system based on the concept of such area expansion is now being examined.

In the wireless mesh network system, wireless network terminals all use one and the same radio channel. It is typical in such a network system to establish communication via plural wireless network terminals on the same channel.

However, the wireless network terminals all make use of the same channel, so that if a certain wireless network terminal is transmitting data on that channel, any wireless network terminals residing around that terminal will not be able to perform data transmission.

Thus, in view of the aforementioned limitation to communication in the wireless mesh network system disturbing efficient communication, it has been proposed in the wireless mesh network system that a wireless network terminal has a plurality of channels and simultaneously uses these channels. This enables wireless network terminals to broaden their communicable bands. Thus, the wireless mesh network system is able to provide efficient communication.

Generally, wireless network terminals in wireless network systems have channels increased and communication data allocated to respective channels, thereby making a usable band wider. One of such systems is disclosed in U.S. Pat. No. 7,058,113 to Etoh. Etoh also discloses a method of communication which adopts a CDMA (Code Division Multiple Access) system using a broad transmission band. In Etoh, column 5, lines 32-40, it is disclosed that the number of usable channels is increased and communication data is assigned to respective spread codes equivalent to channels and transmitted.

However, in the case where one wireless network terminal is prepared with a plurality of different channels and uses these channels for data transmissions different from each other, the wireless network terminal is generally required to have the channels set before being installed. The wireless network terminal has to have those channels set, taking into account radio wave conditions in a location of installation, such as radio wave conditions between itself and other wireless network terminals. Thus, the channel setting is fairly difficult and time-consuming.

Besides, when a wireless network terminal is relocated after channels have been set once, the channels have also to be set again. In this case, wireless network terminals in wireless network systems thus result in reduction in degree of freedom of deployment.

SUMMARY OF THE INVENTION

It is therefore an object of the present invention to provide a channel setting apparatus and a method therefor capable of lightening load associated with channel setting. It is a more specific object of the invention to provide a channel setting apparatus and a method therefor capable of setting channels according to the installation environment of a wireless network terminal and the improvement of the degree of freedom in relocation.

In accordance with the present invention, a channel setting apparatus comprises two transmitter-receivers for transmitting and receiving information on one communication channel of a plurality of communication channels; and a channel controller for causing one of the two transmitter-receivers to employ the one communication channel to search for a communication channel being used by a destination communication unit. The channel controller determines, on the basis of the communication channel obtained by the searching, in what condition there is a surrounding radio wave environment to be connected for communication, and controls channel setting so that respective communication channels of the two transmitter-receivers differ from each other.

Also, in accordance with the present invention, a channel setting method comprises: a first step of employing one communication channel to search for a communication channel being used by a destination communication unit; a second step of determining, on the basis of the communication channel obtained by the searching, in what condition there is a surrounding radio wave environment to be connected for communication, and determining a communication channel; and a third step of determining, on the basis of the communication channel obtained by the searching, in what condition there is a surrounding radio wave environment to be connected for communication, and determining a communication channel different from the communication channel determined in the second step.

According to the channel setting apparatus and method of the present invention, one of the two transmitter-receivers employs one communication channel to search for a communication channel being used by a destination communication unit. The channel controller determines a surrounding radio wave condition based on the communication channel obtained by the searching, and controls channel setting so that the respective communication channels of the two transmitter-receivers differ from each other. Thus, communication channels can be automatically set in accordance with an installation environment, so that the degree of freedom of deployment in redeploying the wireless LAN terminal can be improved. This can lessen channel-setting load. The present invention is advantageously applicable to, for example, a wireless LAN (Local Area Network) unit for setting a communication channel which is used in a wireless LAN.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
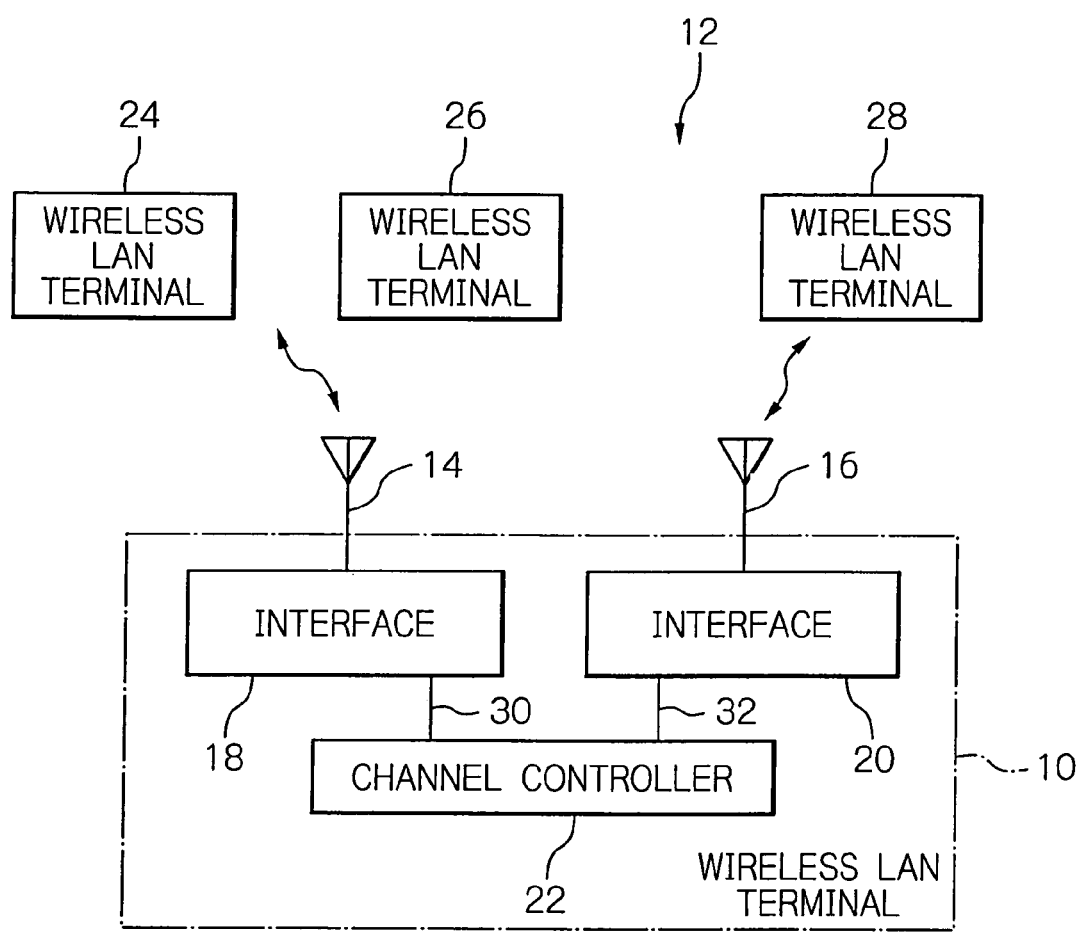
FIG. 1 is a schematic block diagram showing the configuration of wireless LAN terminals in a wireless mesh network system to which applied is a channel setting apparatus according to the present invention.

An embodiment of a channel setting apparatus according to the present invention will herein after be described in detail with reference to the accompanying drawings. Referring initially to FIG. 1, an embodiment of the channel setting apparatus according to the present invention is applied to a wireless LAN (Local Area Network) terminal 10 in a wireless mesh network system 12. The wireless LAN terminal unit, generally designated with 10, includes antennas 14 and 16, interfaces 18 and 20 with a function of transmitting and receiving data on a plurality of channels, and a channel controller 22.

The wireless LAN terminal 10 of the illustrative embodiment is configured such that it employs one channel through one of the interfaces 18 and 20 to search for a channel being used by a destination wireless LAN terminal, determines radio-wave conditions on the basis of the channel in use obtained with the channel controller 22, and controls the setting such that the respective channels of the interfaces 18 and 20 differ from each other. In this manner, communication channels can be automatically set in compliance with an installation environment. Consequently, the degree of freedom of deployment in redeploying or relocating the wireless LAN terminal 10 is improved, whereby channel-setting load is lightened.

In the illustrative embodiment, the channel setting apparatus of the present invention is applied to the wireless LAN terminal 10. Parts or elements not direct relevant to understanding of the present invention will neither be described nor shown for avoiding redundancy.

The wireless LAN terminals 10 are shown in FIG. 1 disposed in the wireless mesh network system 12 implementing a wireless LAN system. The wireless LAN terminal 10, as shown in the FIG. 1, includes the antennas 14 and 16, interfaces 18 and 20, and a channel controller 22.

The antennas 14 and 16 each have the function of transmitting and receiving data in the form of electromagnetic waves to and from other wireless LAN terminals 24, 26, and 28 lying in the communication area of the wireless mesh network system 12. The antennas 14 and 16 are connected to the interfaces 18 and 20, respectively.

The interfaces 18 and 20 each have the function of transmitting and receiving data in accordance with a specific radio transmission method. Each of the interfaces 18 and 20 has one of the usable channels of the wireless LAN terminal 10 set by the channel controller 20 and functions to use the set channel to communicate with another wireless LAN terminal lying in the communication range by radio. More specifically, because the interfaces 18 and 20 cannot employ a plurality of channels at the same time, they perform radio communication on two different channels that were set. While the wireless LAN terminal 10 of the illustrative embodiment is equipped with two interfaces 18 and 20, the present invention is well if it has at least two or more interfaces.

The channel setting will be described in further detail in the illustrative embodiment. If the wireless LAN terminal 10 is started, the one interface 18 of the two interfaces 18 and 20 sets a channel in accordance with a specific channel setting method prior to the other interface 20. This enables the wireless LAN terminal 10 to connect with the wireless LAN terminals 24, 26, and 28, when started, residing around that terminal 10. After the channel setting by the interface 18, the other interface 20 sets a channel other than the channel that was set to the channel 18. This renders it possible for the wireless LAN terminal 10 to efficiently set unused channels and perform radio communication. Although the channel setting in the wireless LAN terminal 10 is performed in the order of interfaces 18 and 20, the present invention is not limited to this order, but may reverse the order. That is, the channel setting may be performed in an arbitrary order.

The interface 18 has a function which, when started, detects whether or not each of usable channels is a channel capable of connecting with the surrounding wireless LAN terminals 24, 26, and 28. The interface 18 is used for scanning the channels being used by the wireless LAN terminals 24, 26, and 28 with this detection function, and supplying a result 30 of the scanning of each channel to the channel controller 22. With a control signal 30 of the channel controller 22, a channel is set to the interface 18. Likewise, the interface 20 functions to scan channels being used with its detection function, and supply a result 32 of the scanning of each channel to the channel controller 22. With a control signal 32 of the channel controller 22, a channel other than the channel set to the interface 18 is set to the interface 20. In the following description, signals are designated by reference numerals given to connection lines on which they appear.

The channel controller 22 has the control function of setting channels to the interfaces 18 and 20. The control function receives the scan results 30 and 32 from the interfaces 18 and 20, and is based on the scan results 30 and 32 of each channel to select channels to be assigned to the interfaces 18 and 20 and set the selected channels to the interfaces 18 and 20.

Figure 2:
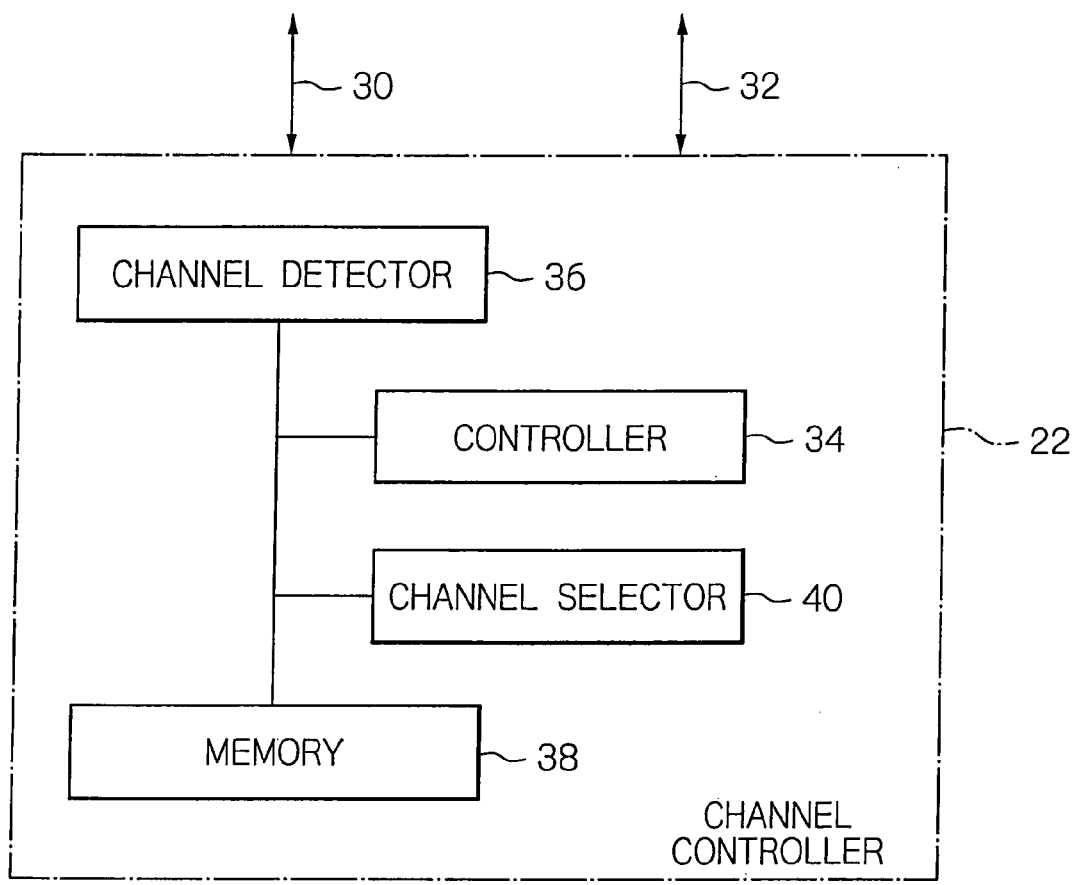
FIG. 2 is a schematic block diagram showing a simplified configuration of the channel controller shown in FIG. 1.

The channel controller 22, as shown in FIG. 2, includes at least a controller 34, a channel detector 36, a memory 38, and a channel selector 40, which are interconnected as illustrated.

The controller 34 has the function of controlling the channel detector 36 and channel selector 40. The channel detector 36 has the function of receiving the scan result 30 obtained for each channel from the interface 18, and storing the scan result 30 of each channel on the memory 38.

The memory 38 has the function of storing various kinds of data required for the channel settings of the interfaces 18 and 20. In the illustrative embodiment, data to be stored through the channel detector 36 includes the scan results 30 and 32 for each channel, the number of wireless LAN terminals using a channel and connected for radio communication in a predetermined channel setting method to be described later, channel information used by the wireless LAN terminals 24, 26, and 28, and so forth.

The channel selector 40 has the function of selecting channels to be assigned to the interfaces 18 and 20. The channel selector 40 in the illustrative embodiment is constructed such that it utilizes data stored on the memory 38 in accordance with a channel setting method to be described later, selects channels to be assigned to the interfaces 18 and 20, and sets to the interfaces 18 and 20 the channels selected under control of the controller 34.

Returning again to FIG. 1, it should be noted that the wireless LAN terminals 24, 26, and 28 in the wireless mesh network system 12 may be the same in structure and operation as the wireless LAN terminal 10 described above.

Figure 3:
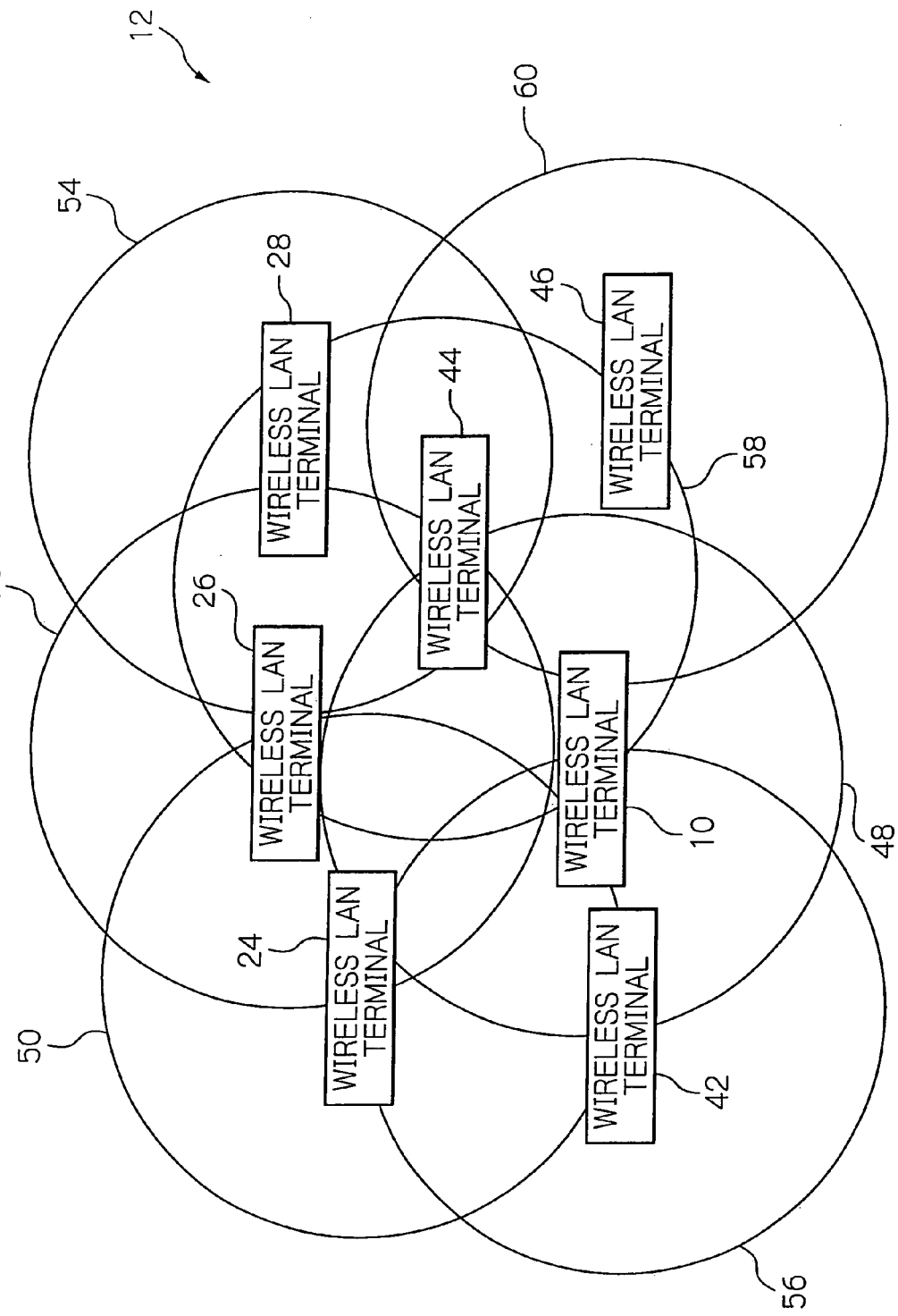
FIG. 3 shows the deployment of wireless LAN terminals in the wireless mesh network system together with the radio wave available zones of the wireless LAN terminals.

Now, a description will be given of operation of the channel setting in the wireless LAN terminal 10 to which applied is the channel setting apparatus of the present invention. The wireless mesh network system 12 shown in FIG. 3 includes not only the wireless LAN terminals 10, 24, 26, and 28 depicted in FIG. 1, but also wireless LAN terminals 42, 44, and 46. The wireless LAN terminals 42, 44, and 46 may similarly include the same constituent elements as the wireless LAN terminal 10. The wireless LAN terminals 10, 24, 26, 42, 44, and 46 in FIG. 3 provide radio-wave available or service zones depicted with circles 48 through 60, respectively.

Figure 4:
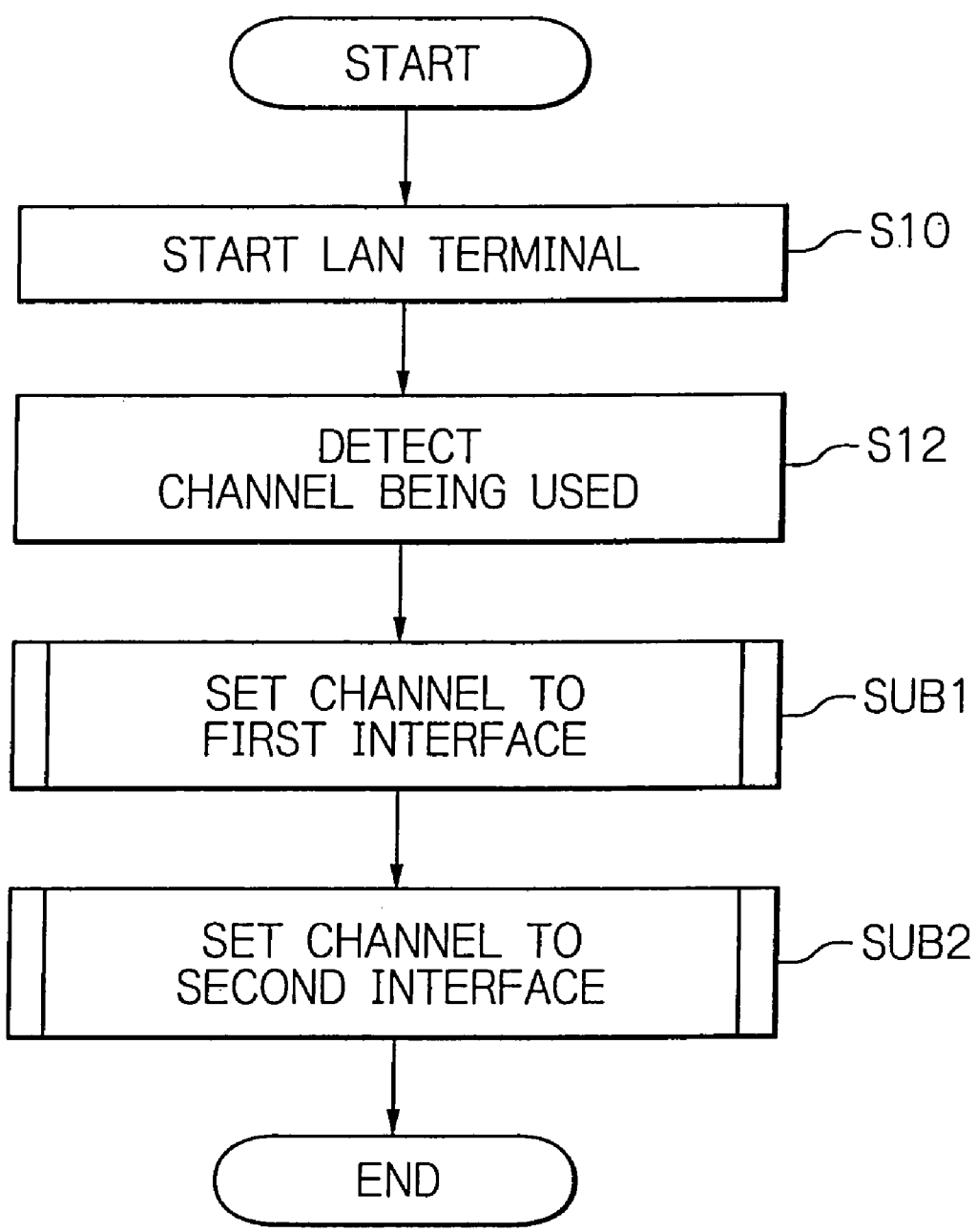
FIG. 4 is a main flowchart useful for understanding how channels are set to the wireless LAN terminal in the wireless mesh network system shown in FIG. 1.

Referring now to FIG. 4, there is shown a channel setting procedure to be executed by the wireless LAN terminal 10. Note that a description of channel setting procedures in the wireless LAN terminals 24, 26, 42, 44, and 46 will not be given because they may be identical with the channel setting procedure in the wireless LAN terminal 10. For instance, in conformity to the IEEE (Institute of Electrical and Electronics Engineers) 802.11a standard, in the case of wireless communication, the number of channels that the wireless LAN terminal 10 can use is generally four channels.

Initially, a power supply is turned on to start the wireless LAN terminal 10 (step S10). After being started, the wireless LAN terminal 10 advances to a channel setting procedure. Under control of the channel controller 22, the interface 18 scans each of the channels of the surrounding wireless LAN terminals 24, 26, 42, 44, and 46 to detect a channel that makes a radio connection with the wireless LAN terminals 24, 26, 42, 44, and 46 possible (step S12). This usable channel is detected by actually using one channel selected at random from four channels to determine whether or not the channel makes a radio connection with the wireless LAN terminals 24, 26, 42, 44, and 46 possible.

Figure 5:
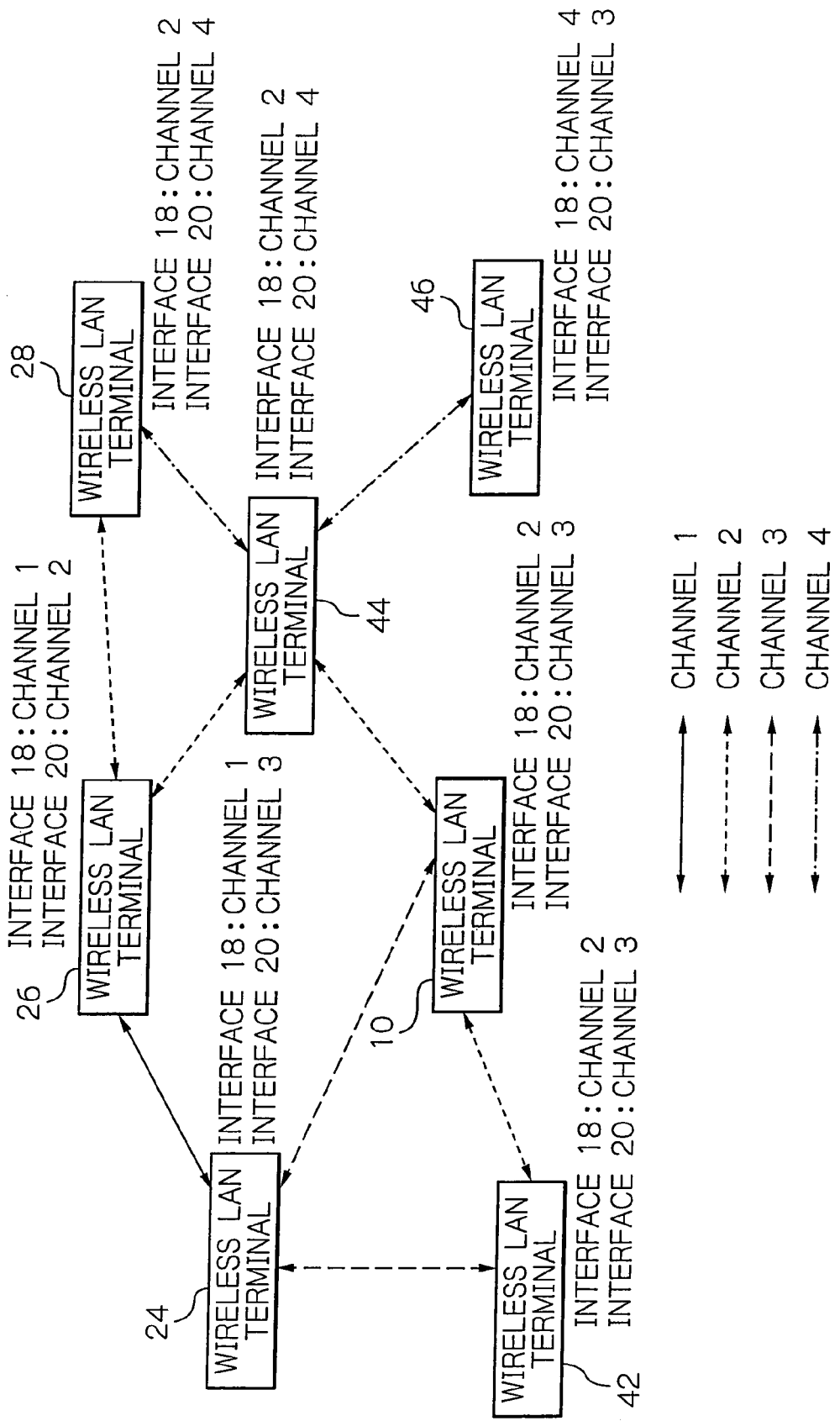
FIG. 5 is a schematic diagram showing the connection relationship between channels assigned to the wireless LAN terminals shown in FIG. 3.

At this time, a relationship between channels assigned to the wireless LAN terminals 10, 24, 26, 42, 44, and 46 is shown in FIG. 5. The four channels 1 to 4 used between the wireless LAN terminals are represented by a solid line, fine dashed lines, rough dashed lines, and an alternate long and short dash line, respectively.

The controller 34 supplies the result 30 detected for each channel to the channel detector 36 of the channel controller 22. The channel controller 36 supplies the channel detection result 30 to the memory 38, on which the detection result 30 for all usable channels is stored.

If the scanning of all channels is completed, the channel controller 22 causes the channel selector 40 to select a channel to be assigned to the interface 18 (subroutine SUB1). The channel controller 22 sets the selected channel to the interface 18.

After a channel to the interface 18 is determined, the channel controller 22 sets a channel that is to be assigned to the interface 20 (subroutine SUB2). After the setting of channels to the interfaces 18 and 20, the channel setting procedure ends.

Figure 6:
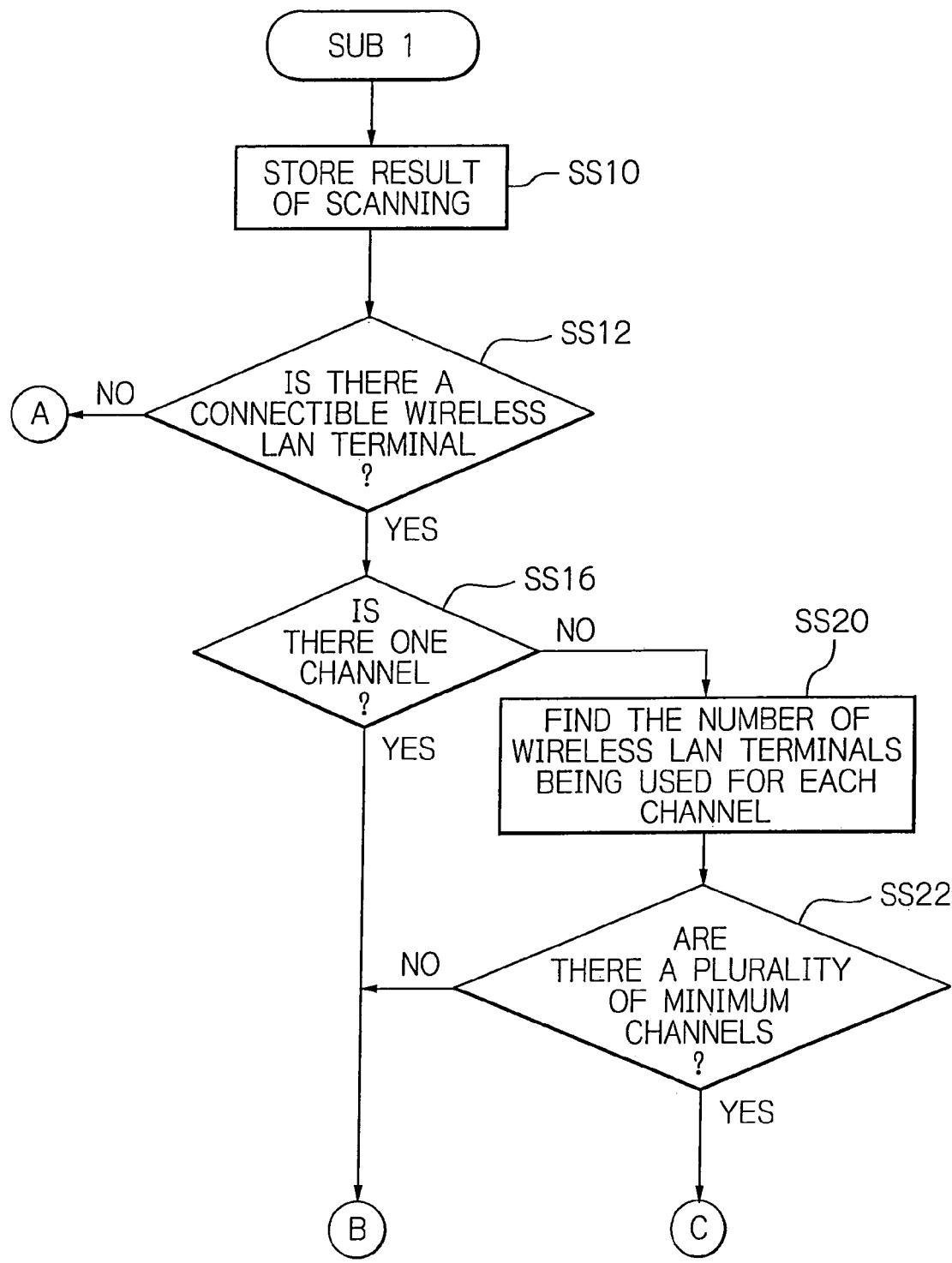
FIGS. 6 and 7 are a flowchart useful for understanding how a first channel is set to the wireless LAN terminal in the wireless mesh network system shown in FIG. 1.
Figure 7:
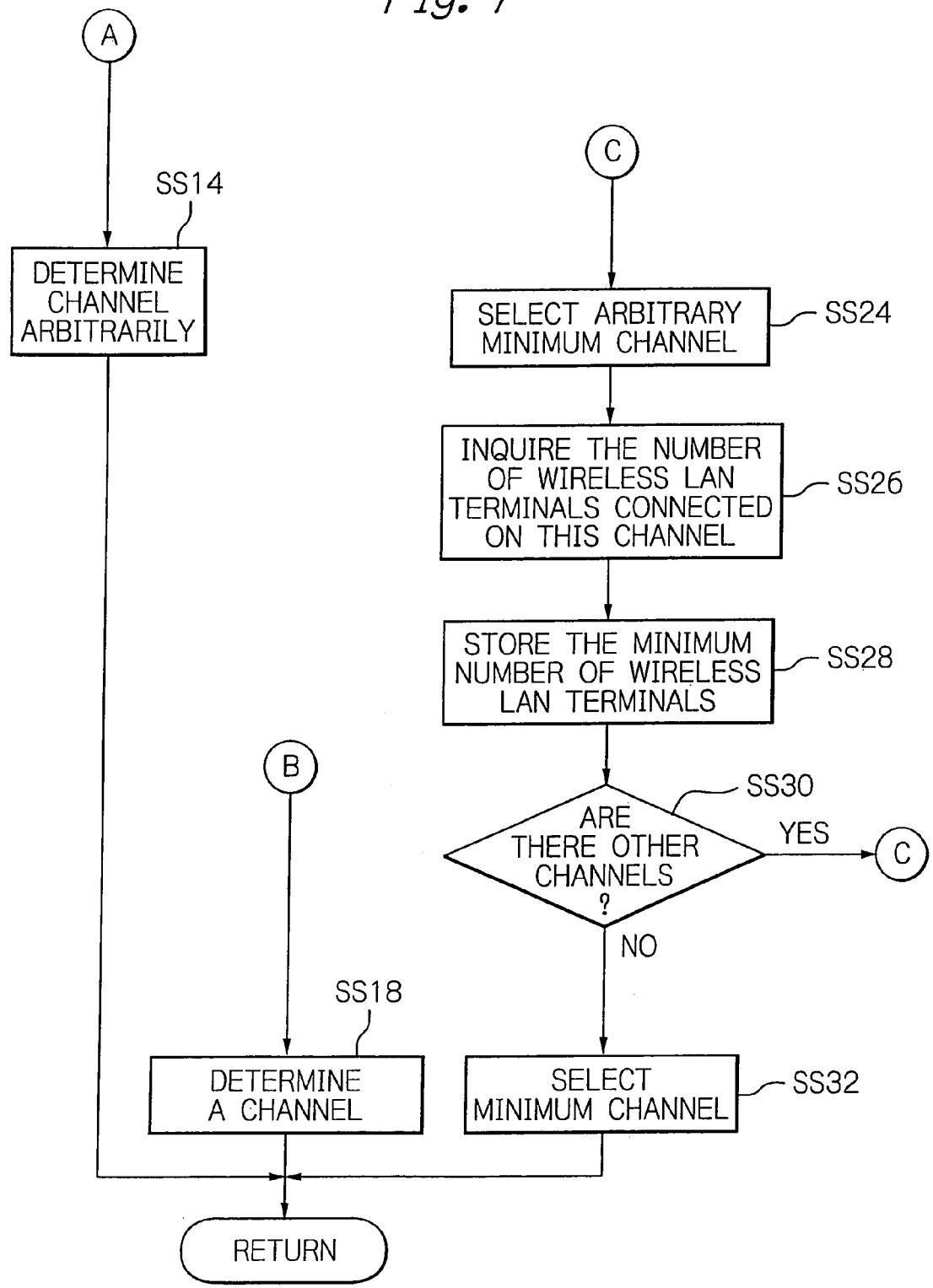

Well, FIGS. 6 and 7 show a first subroutine SUB1 in which a procedure for setting a channel to the interface 18 is implemented in the wireless LAN terminal 10. After being started, the wireless LAN terminal 10 scans each channel and stores on the memory 38 of the channel controller 22 the result 30 detected by this scanning (sub-step SS10, FIG. 6).

If the storing of the scan result 30 for each channel is completed, the channel selector 40 refers to the information stored on the memory 38 under control of the controller 34 and determines whether or not among usable channels there is a channel that is capable of connecting with the wireless LAN terminal 24, 26, 42, 44, or 46 (sub-step SS12). If no channel capable of connecting with the wireless LAN terminal 24, 26, 42, 44, or 46 is detected (NO), the channel selector 40 advances to a channel selection step for non-detection, i.e. sub-step SS14, FIG. 7. If a channel capable of connecting with the wireless LAN terminal 24, 26, 42, 44, or 46 is detected (YES), the channel selector 40 advances to a step of determining the number of channels, i.e. sub-step SS16, FIG. 6.

In the channel selection step for non-detection SS14, the channel selector 40 selects one channel at random from usable channels under control of the controller 34. The channel selector 40 sets the selected channel to the interface 18 under control of the controller 34. After setting this channel, the channel selector 40 advances to a "RETURN" node.

In the channel number determination step SS22, it is determined whether or not the number of channels detected in the channel selector 40 is one (sub-step SS16). When the number of channels detected is one, the channel selector 40 advances to a channel determination step, i.e. sub-step SS18. When the number of channels detected is a plurality of channels, the channel selector 40 advances to a step of counting a wireless LAN terminal number which uses a channel, i.e. sub-step SS20. In the channel determination step SS18, the channel selector 40 sets the detected one channel to the interface 18 under control of the controller 34. After setting this channel, the channel selector 40 advances to the "RETURN" node.

In the wireless LAN terminal number counting step SS20, the channel sector finds the number of wireless LAN terminals being used for each of the channels detected in the wireless mesh network system 12. After finding the number of wireless LAN terminals being used, the channel selector 40 advances to a minimum wireless LAN terminal number determination step, i.e. sub-step SS22.

In the minimum wireless LAN terminal number determination step SS22, the channel sector 40 first finds a channel which is being used by the minimum number of wireless LAN terminals (this channel will hereinafter be referred to as a minimum channel), and then determines whether or not a plurality of minimum channels are present. If the number of minimum channels is one, the channel selector 40 advances to the channel determination step, i.e. sub-step SS18. In the channel determination step SS18, the minimum channel being used by the minimum number of wireless LAN terminals is set to the interface 18. After this channel setting, the channel selector 40 advances to the "RETURN" node. When a plurality of minimum channels (in which the number of wireless LAN terminals is a minimum) are present, the channel selector 40 advances to a random selection step, i.e. sub-step SS24, FIG. 7.

In the random selection step SS24, one minimum channel is selected at random from a plurality of minimum channels obtained by the channel selector 40. The channel selector 40 sets the selected minimum channel to the interface 18 under control of the controller 34.

At this time, the wireless LAN terminal 10 advances to a wireless LAN terminal number inquiry step SS24. In the LAN terminal number inquiry step SS24, the interface 18 is controlled by the channel controller 22. The interface 18 employs the set channel to inquire, of all wireless LAN terminals using the set channel, how many wireless LAN terminals connected on the set channel there are (sub-step SS26).

From among the responses from the wireless LAN terminals, the interface 18 finds the minimum number of wireless LAN terminals connected on the set channel, and the channel detector 36 stores the minimum wireless LAN terminal number on the memory 38.

Next, it is determined whether or not there are channels which are being used by the minimum number of wireless LAN terminals and for which the interface 18 should search (sub-step SS30). When there are such channels, one channel is arbitrarily selected from them, and the wireless LAN terminal number inquiry step and smallest wireless LAN terminal storage step are repeated. If there is no channel for which the interface 18 should search, that is, searching has been completed, the wireless LAN terminal 10 advances to a minimum channel determination step, i.e. sub-step SS32.

In the minimum channel determination step SS32, the channel selector 40 searches for all minimum channels being used by minimum wireless LAN terminal numbers, and selects one minimum channel whose minimum wireless LAN terminal number is smallest among the minimum wireless LAN terminal numbers of the minimum channels stored on the memory 38. The channel selector 40 sets the selected channel to the interface 18 under control of the controller 34. After this channel setting, the channel selector 40 advances to the "RETURN" node.

Note that in the case where minimum wireless LAN terminal numbers for channels are smallest and the same, the channel selector 40 may select a channel at random from the plurality of channels.

Figure 8:
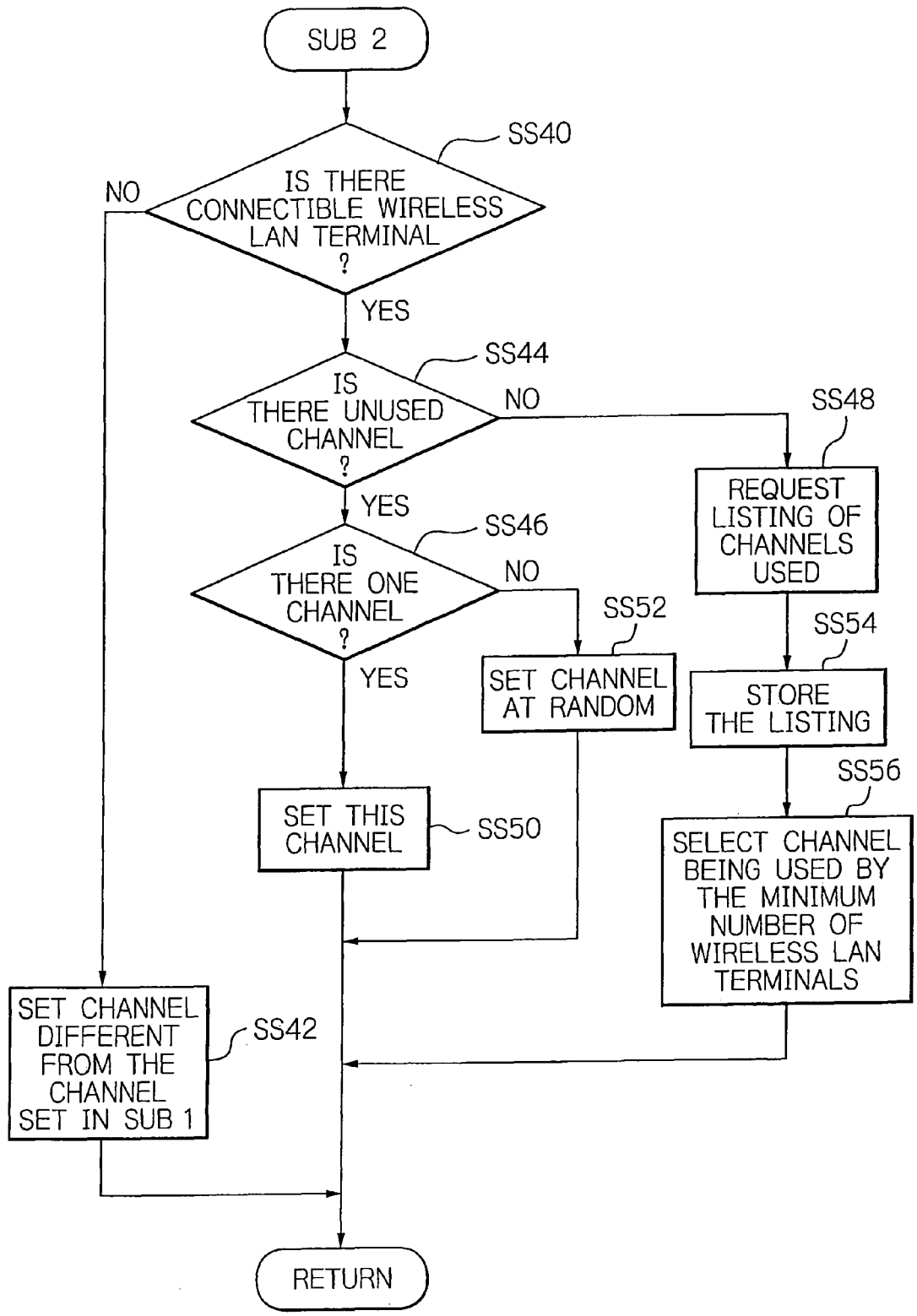
FIG. 8 is a flowchart useful for understanding how a second channel is set to the wireless LAN terminal in the wireless mesh network system shown in FIG. 1.

After advancing to the "RETURN" node via the sub-steps SS14, SS18, and SS32, the wireless LAN terminal 10 finishes the channel setting for the interface 18 and advances to channel setting for the interface 20, i.e. to a second subroutine SUB2, FIG. 8.

Referring now to FIG. 8, there will be described a second subroutine SUB2 in which a procedure for setting a channel to the interface 20 is implemented in the wireless LAN terminal 10. The wireless LAN terminal 10 starts a channel setting procedure for the interface 20 immediately after the end of the channel setting of the first subroutine SUB1.

In the channel setting procedure, by referencing the scan result for each channel shown in FIG. 4, the channel connector 40 determines whether or not an another connectible wireless LAN terminal other than the wireless LAN terminal connected by the interface 18 is present around the wireless LAN terminal 10 (sub-step SS40). When no wireless LAN terminal is present in the radio communication range of the wireless LAN terminal 10, the channel selector 40 advances to a channel setting step for non-detection of wireless LAN terminals, i.e. sub-step SS42. If, like wireless LAN terminals 24, 26, 28, 42, and 44, wireless LAN terminals are present within the radio communication range of the wireless LAN terminal 10 and a channel capable of connecting with a wireless LAN terminal is detected (YES), the channel selector 40 advances to an unused-channel determination step, i.e. sub-step SS44.

In the channel setting step for non-detection of wireless LAN terminals, a different channel than the channel set to the interface 18 is selected from usable channels (sub-step SS42). The channel selector 40 sets the selected channel to the interface 20 under the control of the controller 34. After the channel setting, the channel selector 40 advances to the "RETURN" node.

In the unused-channel determination step SS44, the channel selector 40 determines whether or not there is a channel which is capable of connecting with another wireless LAN terminal and different from the channel set to the interface 18. If such a channel is present (YES), the channel selector 40 advances to a channel number determination step, i.e. sub-step SS46. If such a channel is absent (NO), the channel selector 40 advances to a listing request step, i.e. sub-step SS48.

In the channel number determination step SS46, the channel selector 40 determines whether or not the number of different channels from the set channel is one channel. When only one channel is present, the channel selector 40 advances to a channel setting step, i.e. sub-step SS50. When a plurality of different channels from the set channel are present, the channel selector 40 advances to a random channel setting step, i.e. sub-step SS52.

In the channel setting step SS50, the channel selector 40 determines the different channel as a channel capable of connecting with another wireless LAN terminal. The channel selector 40 sets the determined channel to the interface 20 under control of the controller 34. After the channel setting, the channel selector 40 advances to the "RETURN" node.

In the random channel setting step SS52, the channel selector 40 selects a channel at random from the plurality of channels and determines the selected channel as a channel for the interface 20. The channel selector 40 sets the determined channel to the interface 20 under control of the controller 34. After the channel setting, the channel selector 40 advances to the "RETURN" node.

In the listing request step SS48, the channel selector 40 employs the channel, which was set to the interface 18, to request all of the connected wireless LAN terminals to send a listing of channels used in each wireless LAN terminal. At this time, the interface 18 excludes the same channel as the channel set thereto. Next, the listing obtained by this request is stored on the memory 38 under control of the controller 36 (sub-step SS54).

Next, the channel selector 40 in the wireless LAN terminal 10 refers to the channel listing stored on the memory 38, counts the number of wireless LAN terminals that are using each channel of the channel listing, and selects a channel being used by the minimum number of wireless LAN terminals (sub-step SS56). However, in the case where a plurality of channels being used by the minimum number of wireless LAN terminals are present, the channel selector 40 may select a channel at random from the plurality of channels. The channel selector 40 sets the selected channel to the interface 20 under control of the controller 34. After the channel setting, the channel selector 40 advances to the "RETURN" node.

After advancing to the "RETURN" node via the sub-steps SS42, SS50, SS52, and SS56, the channel selector 40 finishes the channel setting for the interface 20 and terminates the channel setting in the main routine (END). According to such a procedure, the channel setting is automatically performed and ends.

As a specific example, channel setting in a new wireless LAN terminal 62 will be described in the case where the new wireless LAN terminal 62 goes into the radio wave available zone 50 of the wireless LAN terminal 24 in the wireless mesh network system 12. First, the wireless LAN terminal 62 is started. Then, the interface 18 of the wireless LAN terminal 62 scans each of usable channels. Consequently, the interface 18 of the wireless LAN terminal 62 detects that a first channel 1 and a third channel 3 are being used. In the interface 18 of the wireless LAN terminal 62, it is found that channels capable of connecting with the wireless LAN terminal 24 are two channels, i.e., the first channel 1 and third channel 3.

Figure 9:
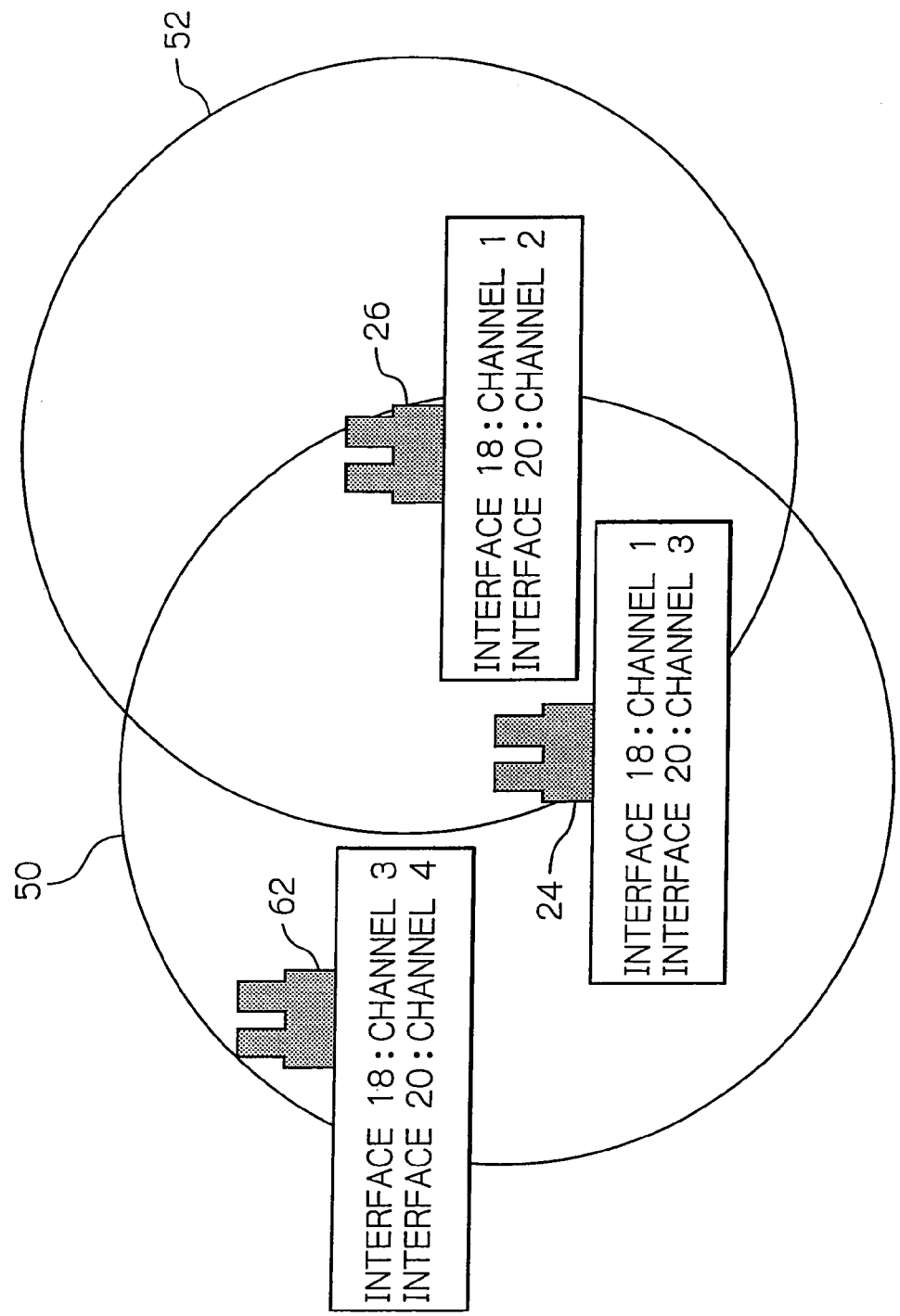
FIG. 9 is a diagram schematically showing the deployment of a new wireless LAN in the wireless mesh network system shown in FIG. 1 and radio wave conditions caused by this deployment.

Next, the interface 18 of the wireless LAN terminal 62 finds the number of wireless LAN terminals using the channels 1 and 3. At this time, as shown in FIG. 9, in the two wireless LAN terminals 24 and 26, the first channel 1 is used by the two wireless LAN terminals 24 and 26, while the third channel 3 is used by only the wireless LAN terminal 24. Accordingly, the third channel 3 is set to the interface 18 of the wireless LAN terminal 62.

Next, in the channel setting for the interface 20 of the wireless LAN terminal 62, a wireless LAN terminal connectible with the wireless LAN terminal 62 is only the wireless LAN terminal 24. Accordingly, a fourth channel 4, which is different than the third channel 3 assigned to the interface 18 of the wireless LAN terminal 62, is set to the interface 20 of the wireless LAN terminal 62.

Also, another radio wave condition in the wireless mesh network system 12 will be examined. For example, consider the case where channel setting is performed when a new wireless LAN terminal 64 goes into a range in which the radio-wave available zone of a wireless LAN terminal 24 and the radio-wave available zone of a wireless LAN terminal 26 overlap each other. If the wireless LAN terminal 64 is started, the interface 18 of the wireless LAN terminal 64 scans each of usable channels, thereby detecting that a second channel 2 and a third channel 3 are being used. The interface 18 of the wireless LAN terminal 64 is able to connect with the wireless LAN terminals 24 and 26. For this relationship it follows that connectible channels of the interface 18 are three channels, i.e., first, second, and third channels 1, 2, and 3.

Figure 10:
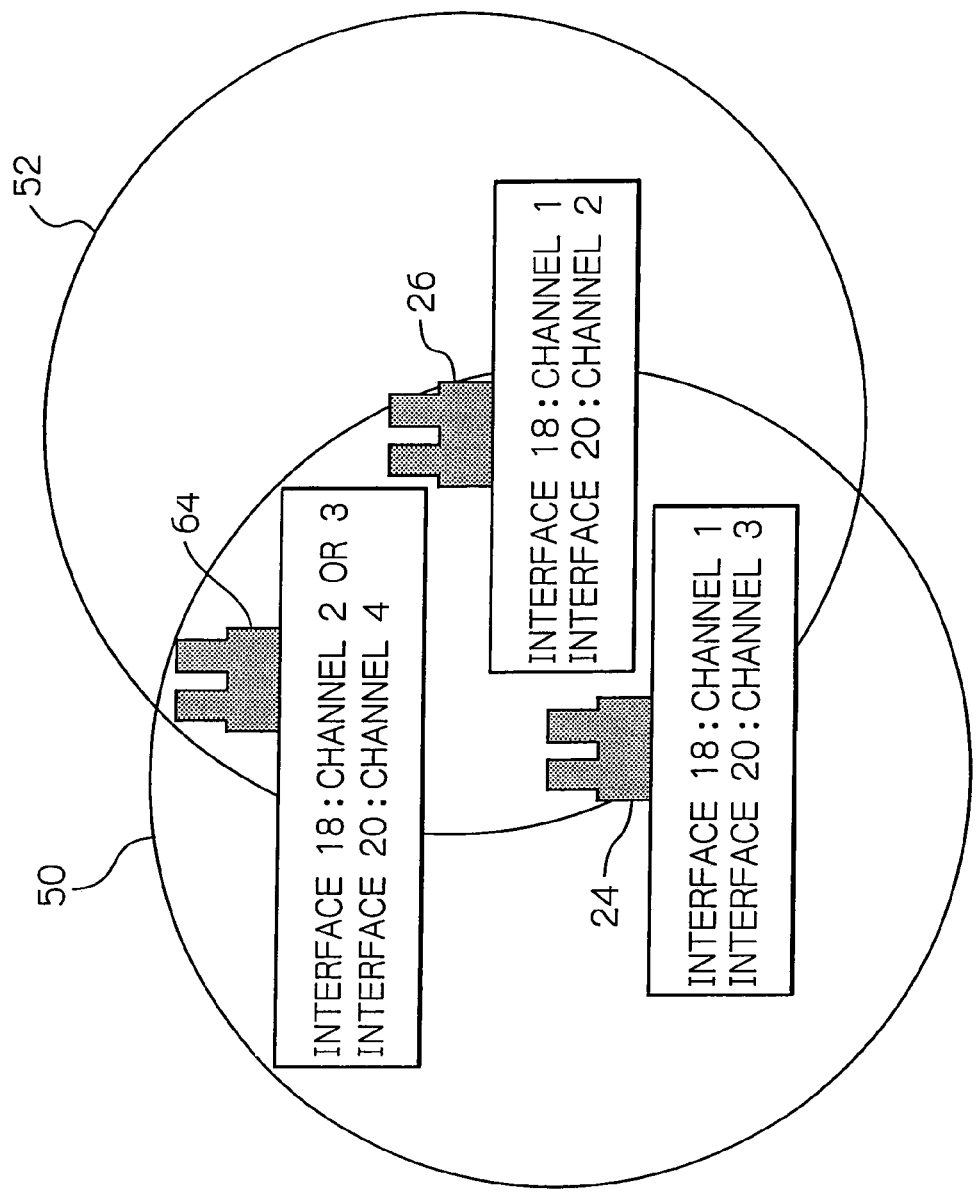
FIG. 10 is a diagram schematically showing the deployment of another new wireless LAN in the wireless mesh network system shown in FIG. 1 and radio wave conditions caused by this deployment.

Next, the interface 18 of the wireless LAN terminal 64 finds the number of wireless LAN terminals using the detected channels. At this time, as shown in FIG. 10, in the two wireless LAN terminals 24 and 26, the first channel 1 is used by the two wireless LAN terminals 24 and 26, while the second channel 2 is used by only the wireless LAN terminal 26. Furthermore, the third channel 3 is used by only the wireless LAN terminal 24. Accordingly, the second channel 2 or third channel 3 is set to the interface 18 of the wireless LAN terminal 64. Note that a detailed description of the channel setting in the wireless LAN terminal 64 will be omitted. In the illustrative embodiment, the second channel 2 is set to the interface 18 of the wireless LAN terminal 64. If the third channel 3 is set to the interface 18 of the wireless LAN terminal 64, the interface 18 of the wireless LAN terminal 64 will connect with the wireless LAN terminal 24.

Next, in the channel setting for the interface 20 of the wireless LAN terminal 64, a wireless LAN terminal connectible with the wireless LAN terminal 64 is present around the wireless LAN terminal 64. Accordingly, the wireless LAN terminal 64 is assigned a channel which is not being used by the wireless LAN terminals 24 and 26. In this case, a fourth channel 4 is present. Accordingly, the interface 20 of the wireless LAN terminal 64 has the fourth channel 4 set thereto.

In the above-described embodiment, the channel setting apparatus of the present invention is applied to a wireless mesh network system, and communication protocols, settings, and standards are specifically described. It is however needless to say that if wireless access points all can have common management information representing a connection state in a wireless network terminal, channels can be set without being limited to protocols, settings, and standards. While it has been disclosed that the interfaces 18 and 20 of aforementioned wireless LAN terminal 10 comprise discrete components, they may be formed integrally with each other Also, the wireless LAN terminal 10 shown in FIG. 1 may function as an access point in a wireless mesh network 12 which is connectible with one or a plurality of client terminals. In this case, the access point may be equipped with a client terminal side interface which makes possible either an electrical connection with a client terminal or a radio communication therewith. Moreover, in this case, when the access point connects with a client terminal by radio, the interfaces of the access point and client terminal may preferably employ separate or one and the same constituent element. This renders it possible to reduce the configuration scale of the access point.

In the above-described embodiment, while the communication between wireless LAN terminals has been described as a wireless mesh network system which performs radio communication, the present invention is also applicable to network systems in which access points perform wire communication with each other, and network systems in which some of access points perform wire communication with each other.

In the above-described embodiment, the functions of the wireless LAN terminal 10 have been disclosed as hardware components for convenience of description. However, it need scarcely be said that those functions can be implemented in the form of software programs.

As has been described hereinabove, the wireless LAN terminal 10 in the illustrative embodiment includes at least two interfaces, and when a new wireless LAN terminal is started, channel setting of one of the two interfaces is performed prior to the other. In this manner, a connection with surrounding wireless LAN terminals can be ensured.

According to the illustrative embodiment, by setting an unused channel to the other interface, efficient channel setting can be automatically performed. Consequently, advance channel-setting load can be lightened and the degree of freedom of redeployment of wireless LAN terminals can also be improved.

The entire disclosure of Japanese patent application No. 2006-45473 filed on Feb. 22, 2006, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A channel setting apparatus for setting at least one communication channel, the channel setting apparatus being installed in a wireless LAN terminal for transmitting information over at least one of a plurality of communication channels, comprising:

a plurality of antennas used to communicate with external wireless LAN terminals;

a channel controller for causing a search for a communication channel that is being used, and for determining, based on the communication channel in use obtained by the search, a condition of a surrounding radio wave environment and for controlling channel setting so that respective communication channels differ from each other; and a plurality of wireless interfaces, connected to the antennas and the channel controller, for establishing communications between the plurality of antennas and other external wireless LAN terminals, wherein the channel controller includes:
   a memory for storing the information relating to the communication channel in use;
   a channel detector for controlling operation of the memory;
   a channel selector for selecting a communication channel that is to be used based on the information relating to the communication channel in use that is stored on the memory; and
   a controller for controlling operations of the channel detector and channel selector, wherein the channel controller:
   sets a communication channel connectable to the wireless LAN terminal equipped with the channel setting apparatus and its surrounding wireless LAN terminals to a first communication channel of the plurality of communication channels,
   searches in the wireless LAN terminal equipped with the channel setting apparatus the communication channels used by the surrounding wireless LAN terminals for setting a communication channel other than the communication channel connectable to the surrounding wireless LAN terminals,
   interrogates the surrounding wireless LAN terminals about statuses of use of communication channels,
   finds, if it is determined that a plurality of communication channels are connectable to the surrounding wireless LAN terminals, the number of surrounding wireless LAN terminals that use respective communication channels for every communication channel,
   finds a communication channel being used by a minimum number of surrounding wireless LAN terminals which use each found communication channel, and
   selects, when some communication channels have the minimum and same surrounding wireless LAN terminal numbers, one channel from these communication channels to set it to a first one of the plurality of wireless interfaces, wherein the first wireless interface uses the set communication channel to interrogate all surrounding wireless LAN terminals using the set communication channel about the number of terminals connected to the set communication channel, wherein the memory stores the number of terminals connected to the set communication channel on the basis of the inquiry made by the first wireless interface, and wherein the channel selector selects from the memory a minimum communication channel whose minimum wireless LAN terminal number is smallest among the minimum wireless LAN terminal numbers of the minimum channels so as to set the selected communication channel to the first wireless interface.

2. The channel setting apparatus in accordance with claim 1, wherein, at the time of setting the communication channel to the first wireless interface, the channel controller selects one communication channel at random from the plurality of communication channels to thereby set the selected communication channel to the first wireless interface.

3. The channel setting apparatus in accordance with claim 1, wherein the channel controller determines whether or not another connectible wireless LAN terminal other than the wireless LAN terminal connected by the first wireless interface is present around the wireless LAN terminal, and, when a determination result shows that no wireless LAN terminal is present around the wireless LAN terminal, selects a different communication channel than the communication channel set to the first wireless interface to set the selected communication channel to a second one of the plurality of wireless interfaces.

4. The channel setting apparatus in accordance with claim 1, wherein the channel controller determines whether or not another connectible wireless LAN terminal other than the wireless LAN terminal connected by the first wireless interface is present around the wireless LAN terminal, and when a determination result shows that another wireless LAN terminal is present around the wireless LAN terminal, then determines whether or not there is a communication channel which is different from the communication channel set to the first wireless interface and capable of connecting with another wireless LAN terminal, and sets, when a determination result shows that one communication channel capable of connecting with another wireless LAN terminal is present, the determined channel to the second wireless interface.

5. The channel setting apparatus in accordance with claim 1, wherein the channel controller determines whether or not another connectible wireless LAN terminal other than the wireless LAN terminal connected by the first wireless interface is present around the wireless LAN terminal, and, when a determination result shows that a plurality of communication channels capable of connecting with another wireless LAN terminal is present around, selects a communication channel at random from the plurality of communication channels to set the selected channel to the second wireless interface.

6. The channel setting apparatus in accordance with claim 5, wherein, in requesting for the channel listing, the first wireless interface excludes the channel listings which include the same communication channel as the channel set to the first wireless interface.

7. A wireless LAN (Local Area Network) terminal unit in for use a wireless mesh network system, comprising:
   a first wireless LAN interface having a function of communicating wirelessly with a first wireless LAN terminal unit using a first channel and another wireless LAN terminal unit having a second wireless LAN terminal unit using a second channel; and
   a channel controller,
   wherein the first wireless LAN interface scans every usable channel,
   wherein the channel controller determines whether or not, among the scanned channels, there is a channel that is capable of connecting with one or more wireless LAN terminal units of other wireless LAN terminal units,
   wherein, if no channel capable of connecting with another wireless LAN terminal unit is detected, the channel controller then selects one channel at random from the usable channels and sets the selected channel to the first wireless LAN interface as a third channel, wherein if only the first channel capable of connecting with the first wireless LAN terminal unit is detected, the channel controller sets the first channel to the first wireless LAN interface, wherein, if the first channel capable of connecting with the first wireless LAN terminal unit and a plurality of channels capable of connecting with the second wireless LAN terminal unit including the second channel are detected, and if the number of the other wireless LAN terminal units using the first channel is a minimum number of a while the number of the other wireless LAN terminal units using the second channel is b, which is larger than a, the channel controller sets the first channel to the first wireless LAN interface, wherein, if the first channel capable of connecting with the first wireless LAN terminal unit and a plurality of channels capable of connecting with the second wireless LAN terminal unit including the second channel are detected, and if the number of the other wireless LAN terminal units using the first channel is the minimum number of a while the number of the other wireless LAN terminal units using the second channel is the minimum number of a, and if in first wireless LAN terminal units of the number of the other a-wireless LAN terminal units establishing the wireless connection by the first channel, the number of the wireless LAN terminal units which establish the wireless connection by the first channel is a minimum number of c while, in second wireless LAN terminal units of the number of the other a-wireless LAN terminal units establishing the wireless connection by the second channel, the number of the wireless LAN terminal units which establish the wireless connection by the second channel is a minimum number of d, and if the number of c is smaller than the number of d, the channel controller sets the first channel to the first wireless LAN interface.

8. The wireless LAN terminal unit in accordance with claim 7, wherein, if the first channel capable of connecting with the first wireless LAN terminal unit and a plurality of channels capable of connecting with the second wireless LAN terminal unit including the second channel are detected, and if the number of the other wireless LAN terminal units using the first channel is the minimum number of a while the number of the other wireless LAN terminal units using the second channel is the minimum number of a, and if in first wireless LAN terminal units of the number of the other a-wireless LAN terminal units establishing the wireless connection by the first channel, the number of the wireless LAN terminals which establish the wireless connection by the first channel is the minimum number of c while, in second wireless LAN terminal units of the number of the other a-wireless LAN terminal units establishing the wireless connection by the second channel, the number of the wireless LAN terminal units which establish the wireless connection by the second channel is the minimum number of c, the channel controller selects the first or second channel at random to set the selected channel to the wireless LAN interface.

9. The wireless LAN terminal unit in accordance with claim 7, wherein if the first channel capable of connecting with the first wireless LAN terminal unit and a plurality of channels capable of connecting with the second wireless LAN terminal unit including the second channel are detected, and if the number of the other wireless LAN terminal units using the first channel is the minimum number of a while the number of the other wireless LAN terminal units using the second channel is the minimum number of a, and if in first wireless LAN terminals of the number of the other a-wireless LAN terminal units establishing the wireless connection by the first channel, the number of the wireless LAN terminal units which establish the wireless connection by the first channel is the minimum number of c while, in second wireless LAN terminals of the number of the other a-wireless LAN terminal units establishing the wireless connection by the second channel, the number of the wireless LAN terminal units which establish the wireless connection by the second channel is the minimum number of d, and if the number of c is smaller than the number of d, the channel controller selects the detected first channel to set it to the first wireless LAN interface, the first wireless LAN interface uses the first channel thus set to establish communication with each wireless LAN terminal unit of the number of the other a-wireless LAN terminal units using the first channel for inquiring the number of the wireless LAN terminals establishing connection using the first channel, and among the responses for the inquiry, finds that the minimum number of is c, the channel controller further selects the detected second channel to set it to the first wireless LAN interface, the first wireless LAN interface uses the second channel thus set to establish communication with each wireless LAN terminal unit of the number of the other a-wireless LAN terminal units using the second channel for inquiring the number of the wireless LAN terminal units establishing connection using the second channel, and among the responses for the inquiry, finds that the minimum number of is d, and the channel controller then determine whether or not the response from the first wireless LAN terminal unit of the number of the other a-wireless LAN terminal units using the first channel shows that the minimum number is c while the response from the second wireless LAN terminal unit of the number of the other a-wireless LAN terminal units using the second channel shows that the minimum number is d and the number of c is smaller than d.

10. The wireless LAN terminal unit in accordance with claim 7, wherein the first wireless LAN interface sets the channel set by the channel controller to the third channel, and if a wireless LAN terminal unit, to which the first wireless LAN interface establishes wireless connection by the third channel set in the channel controller, is defined as a third wireless LAN terminal, the channel controller determines whether or not the first wireless LAN interface is present in the wireless LAN terminal units other than the third wireless LAN terminal unit, the channel controller selects, if no wireless LAN terminal units other than a fourth wireless LAN terminal unit are present, from the usable channels a fourth channel which is different from the third channel so as to define the selected fourth channel to the first wireless LAN interface, the channel controller determines, if the other wireless LAN terminal units are present except the fourth wireless LAN terminal unit, whether or not there is a channel different from the third channel and capable of establishing wireless connection with the other wireless LAN terminal units except the third wireless LAN terminal unit, the channel controller sets, if there is only the fourth channel which is capable of connecting with the fourth wireless LAN terminal unit of the other wireless LAN terminal unit, the fourth channel to the second wireless LAN interface, if there are the fourth channel which is capable of connecting with the fourth wireless LAN terminal unit of the other wireless LAN terminal unit and a plurality of channels including a fifth channel capable of connecting with a fifth wireless LAN terminal unit, the channel controller selects the fourth or fifth channel at random to set the selected channel to the second wireless LAN interface, the first wireless LAN interface uses, if there is no channel capable of connecting with the other wireless LAN terminal unit, the third channel to request the other wireless LAN terminal units using the third channel, which include the third wireless LAN terminal unit and are capable of connecting with the wireless LAN terminal unit, to send a listing of channels indicative of the channels used by the other wireless LAN terminal units and receives the listing from the other wireless LAN terminal units, and the channel controller in turn refers the listing of channels, and selects a channel being used by the minimum number of wireless LAN terminal units to set the selected channel to the second wireless LAN interface.

11. The wireless LAN terminal unit in accordance with claim 10, wherein the first wireless LAN interface uses the fourth channel if there is no channel capable of connecting with the other wireless LAN terminal units to request the other wireless LAN terminal units using the fourth channel, which include the fourth wireless LAN terminal and are capable connecting with the wireless LAN terminal unit, to send a listing of channels indicative of the channels used by the other wireless LAN terminal units, and receives the listing from the other wireless LAN terminal units, and the channel controller refers the listing of channels, and if there is a plurality of channels being used by the minimum number of wireless LAN terminal units, selects one channel at random from the plurality of channels to set the selected channel to the second wireless LAN interface.

12. The wireless LAN terminal unit in accordance with claim 10, wherein the first wireless LAN interface uses the fourth channel if there is no channel capable of connecting with the other wireless LAN terminal units to request the other wireless LAN terminal units using the fourth channel, which include the fourth wireless LAN terminal unit and are capable connecting with the wireless LAN terminal unit, to send a listing of channels indicative of the channels used by the other wireless LAN terminal units, and receives the listing from the other wireless LAN terminal units, and the channel controller excludes the fifth channel from the listing of channels and then refers the listing to select a channel being used by the minimum number of wireless LAN terminal units as a seventh channel, and sets the selected seventh channel to the second wireless LAN interface.

13. The wireless LAN terminal unit in accordance with claim 7, wherein the first wireless LAN interface scans every usable channel when a power supply is turned on to start the wireless LAN terminal unit.

14. A method for setting a channel by using a wireless LAN (Local Area Network) terminal unit in a wireless mesh network system for setting a communication channel, which is installed in a wireless apparatus for transmitting information over at least one of a plurality of communication channels, the wireless LAN terminal unit including a first wireless LAN interface having a function for communicating wirelessly with a first wireless LAN terminal unit using a first channel and another wireless LAN terminal unit having a second wireless LAN terminal unit using a second channel; and a channel controller, wherein the first wireless LAN interface scans every usable channel, and wherein the channel controller determines whether or not among the scanned channels there is a channel that is capable of connecting with one or more wireless LAN terminal units of another wireless LAN terminal unit, wherein the method comprises:

a first step of employing the channel controller to select, if no channel capable of connecting with another wireless LAN terminal unit is detected, one channel at random from usable channels and setting the selected channel to the first wireless LAN interface as a third channel;

a second step of employing the channel controller to set, if only the first channel capable of connecting with the first wireless LAN terminal unit is detected, the first channel to the first wireless LAN interface;

a third step of employing the channel controller, if the first channel capable of connecting with the first wireless LAN terminal unit and a plurality of channels capable of connecting with the second wireless LAN terminal unit including the second channel are detected and if the number of the other wireless LAN terminal units using the first channel is the minimum number of a while the number of the other wireless LAN terminal units using the second channel is b which is larger than a, to set the first channel to the first wireless LAN interface; and a fourth step of employing the channel controller, if the first channel capable of connecting with the first wireless LAN terminal unit and a plurality of channels capable of connecting with the second wireless LAN terminal unit including the second channel are detected, and if the number of the other wireless LAN terminal units using the first channel is the minimum number of a while the number of the other wireless LAN terminal units using the second channel is the minimum number of a, and if in first wireless LAN terminal units of the number of the other a-wireless LAN terminal units establishing the wireless connection by the first channel, the number of the wireless LAN terminal units which establish the wireless connection by the first channel is the minimum number of c while, in second wireless LAN terminal units of the number of the other a-wireless LAN terminal units establishing the wireless connection by the second channel, the number of the wireless LAN terminal units which establish the wireless connection by the second channel is the minimum number of d, and if the number of c is smaller than the number of d, to set the first channel to the first wireless LAN interface.

15. The method for setting a channel by using the wireless LAN terminal unit in accordance with claim 14, wherein if the first channel capable of connecting with the first wireless LAN terminal unit and a plurality of channels capable of connecting with the second wireless LAN terminal unit including the second channel are detected, and if the number of the other wireless LAN terminal units using the first channel is the minimum number of a while the number of the other wireless LAN terminal units using the second channel is the minimum number of a, and if in first wireless LAN terminal units of the number of the other a-wireless LAN terminal units establishing the wireless connection by the first channel, the number of the wireless LAN terminal units which establish the wireless connection by the first channel is the minimum number of c while, in second wireless LAN terminal units of the number of the other a-wireless LAN terminal units establishing the wireless connection by the second channel, the number of the wireless LAN terminal units which establish the wireless connection by the second channel is the minimum number of c, the channel controller selects the first or second channel at random to set the selected channel to the wireless LAN interface.

16. The method for setting a channel by using the wireless LAN terminal unit in accordance with claim 14, wherein if the first channel capable of connecting with the first wireless LAN terminal unit and a plurality of channels capable of connecting with the second wireless LAN terminal unit including the second channel are detected, and if the number of the other wireless LAN terminal units using the first channel is the minimum number of a while the number of the other wireless LAN terminal units using the second channel is the minimum number of a, and if in first wireless LAN terminal units of the number of the other a-wireless LAN terminal units establishing the wireless connection by the first channel, the number of the wireless LAN terminal units which establish the wireless connection by the first channel is the minimum number of c while, in second wireless LAN terminal units of the number of the other a-wireless LAN terminal units establishing the wireless connection by the second channel, the number of the wireless LAN terminal units which establish the wireless connection by the second channel is the minimum number of d, and if the number of c is smaller than the number of d, the channel controller selects the detected first channel to set it to the first wireless LAN interface, the first wireless LAN interface uses the first channel thus set to establish communication with each wireless LAN terminal unit of the number of the other a-wireless LAN terminal units using the first channel for inquiring the number of the wireless LAN terminal units establishing connection using the first channel, and among the responses for the inquiry, finds that the minimum number of is c, the channel controller further selects the detected second channel to set it to the first wireless LAN interface, the first wireless LAN interface uses the second channel thus set to establish communication with each wireless LAN terminal unit of the number of the other a-wireless LAN terminal units using the second channel for inquiring the number of the wireless LAN terminal units establishing connection using the second channel, and among the responses for the inquiry, finds that the minimum number of is d, and the channel controller then determines whether or not the response from the first wireless LAN terminal unit of the number of the other a-wireless LAN terminal units using the first channel shows that the minimum number is c while the response from the second wireless LAN terminal unit of the number of the other a-wireless LAN terminal units using the second channel shows that the minimum number is d and the number of c is smaller than d.

17. The method for setting a channel by using the wireless LAN terminal unit in accordance with claim 14, wherein the first wireless LAN interface sets the channel set by the channel controller to the third channel, and if a wireless LAN terminal unit, to which the first wireless LAN interface establishes wireless connection by the third channel set in the channel controller, is defined as a third wireless LAN terminal unit, the channel controller determines whether or not the first wireless LAN interface is present in the wireless LAN terminal units other than the third wireless LAN terminal unit, the channel controller selects, if no wireless LAN terminal units other than a fourth wireless LAN terminal unit are present, from the usable channels a fourth channel which is different from the third channel so as to define the selected fourth channel to the first wireless LAN interface, the channel controller determines, if the other wireless LAN terminal units are present except the fourth wireless LAN terminal unit, whether or not there is a channel different from the third channel and capable of establishing wireless connection with the other wireless LAN terminal units except the third wireless LAN terminal unit, the channel controller sets, if there is only the fourth channel which is capable of connecting with the fourth wireless LAN terminal unit of the other wireless LAN terminal unit, the fourth channel to the second wireless LAN interface, if there are the fourth channel which is capable of connecting with the fourth wireless LAN terminal unit of the other wireless LAN terminal unit and a plurality of channels including a fifth channel capable of connecting with a fifth wireless LAN terminal unit, the channel controller selects the fourth or fifth channel at random to set the selected channel to the second wireless LAN interface, the first wireless LAN interface uses, if there is no channel capable of connecting with the other wireless LAN terminal unit, the third channel to request the other wireless LAN terminal units using the third channel, which include the third wireless LAN terminal unit and are capable of connecting with the wireless LAN terminal unit, to send a listing of channels indicative of the channels used by the other wireless LAN terminal units and receives the listing from the other wireless LAN terminal units, and the channel controller in turn refers the listing of channels, and selects a channel being used by the minimum number of wireless LAN terminal units to set the selected channel to the second wireless LAN interface.

18. The method for setting a channel by using the wireless LAN terminal unit in accordance with claim 14, wherein the first wireless LAN interface uses the fourth channel if there is no channel capable of connecting with the other wireless LAN terminal units to request the other wireless LAN terminal units using the fourth channel, which include the fourth wireless LAN terminal unit and are capable connecting with the wireless LAN terminal unit, to send a listing of channels indicative of the channels used by the other wireless LAN terminal units, and receives the listing from the other wireless LAN terminal units, and the channel controller refers the listing of channels, and if there is a plurality of channels being used by the minimum number of wireless LAN terminal units, selects one channel at random from the plurality of channels to set the selected channel to the second wireless LAN interface.

19. The method for setting a channel by using the wireless LAN terminal unit in accordance with claim 14, wherein the first wireless LAN interface uses the fourth channel if there is no channel capable of connecting with the other wireless LAN terminal units to request the other wireless LAN terminal units using the fourth channel, which include the fourth wireless LAN terminal unit and are capable connecting with the wireless LAN terminal unit, to send a listing of channels indicative of the channels used by the other wireless LAN terminal units, and receives the listing from the other wireless LAN terminal units, and the channel controller excludes the fifth channel from the listing of channels and then refers the listing to select a channel being used by the minimum number of wireless LAN terminal units as a seventh channel, and sets the selected seventh channel to the second wireless LAN interface.

20. The method for setting a channel by using the wireless LAN terminal unit in accordance with claim 14, wherein the first wireless LAN interface scans every usable channel when a power supply is turned on to start the wireless LAN terminal unit.

* * * * *